Dec. 5, 1967    J. DAUGHERTY    3,355,800

MACHINE TOOL HEADSTOCK

Original Filed July 30, 1964    5 Sheets-Sheet 1

INVENTOR
JESSE DAUGHERTY
by: Wolfe, Hubbard, Voit & Osann
ATTORNEY

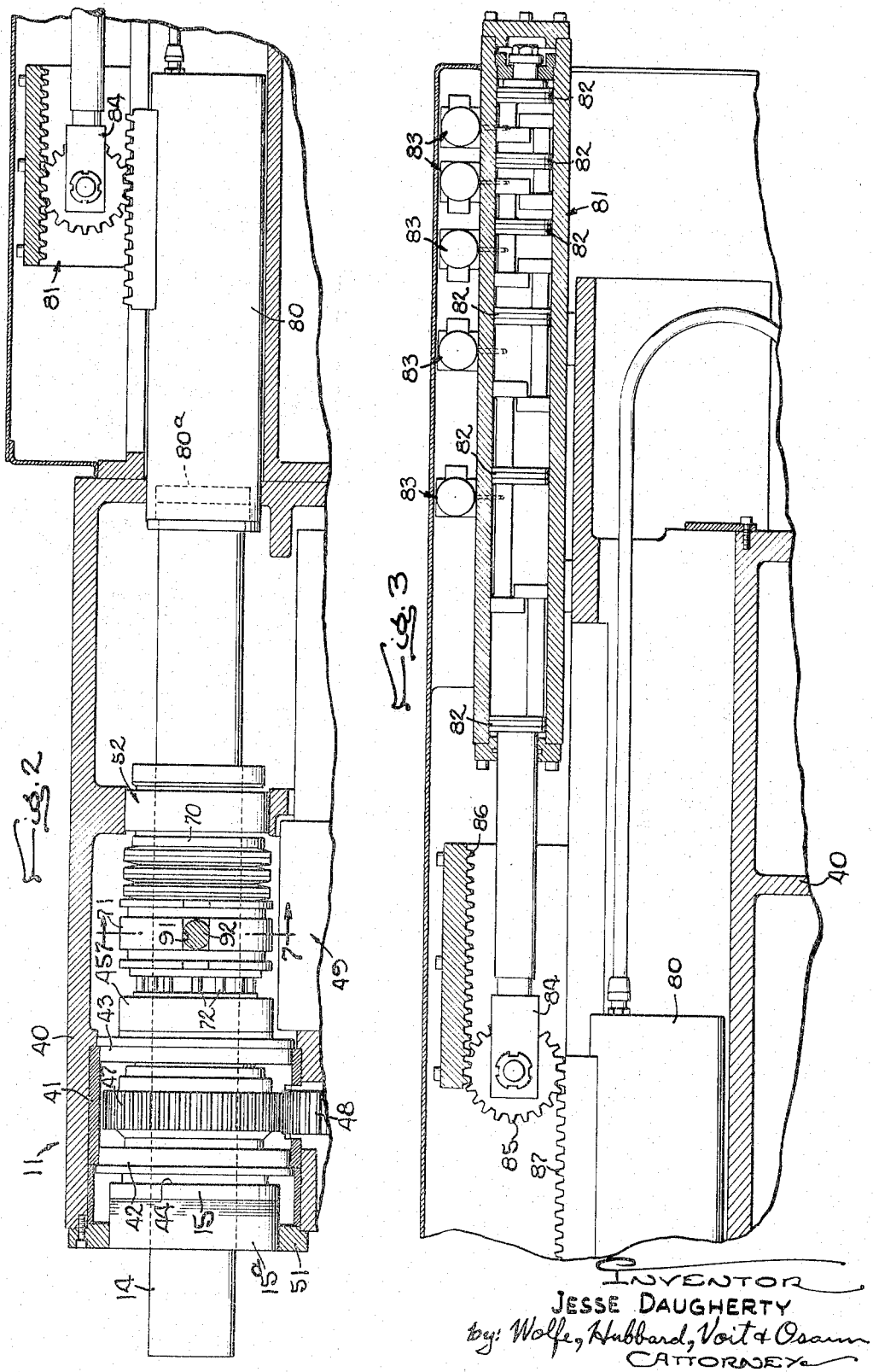

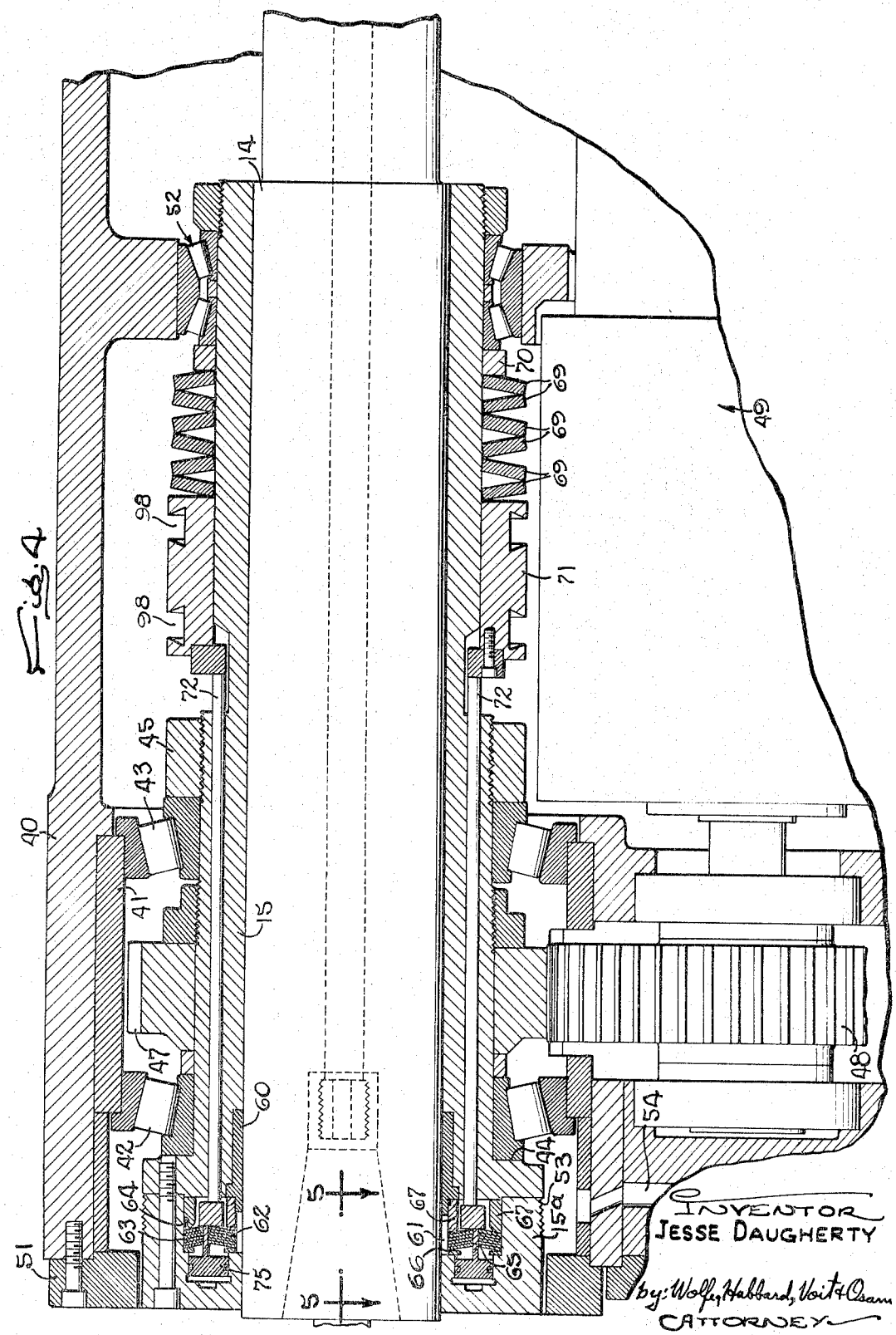

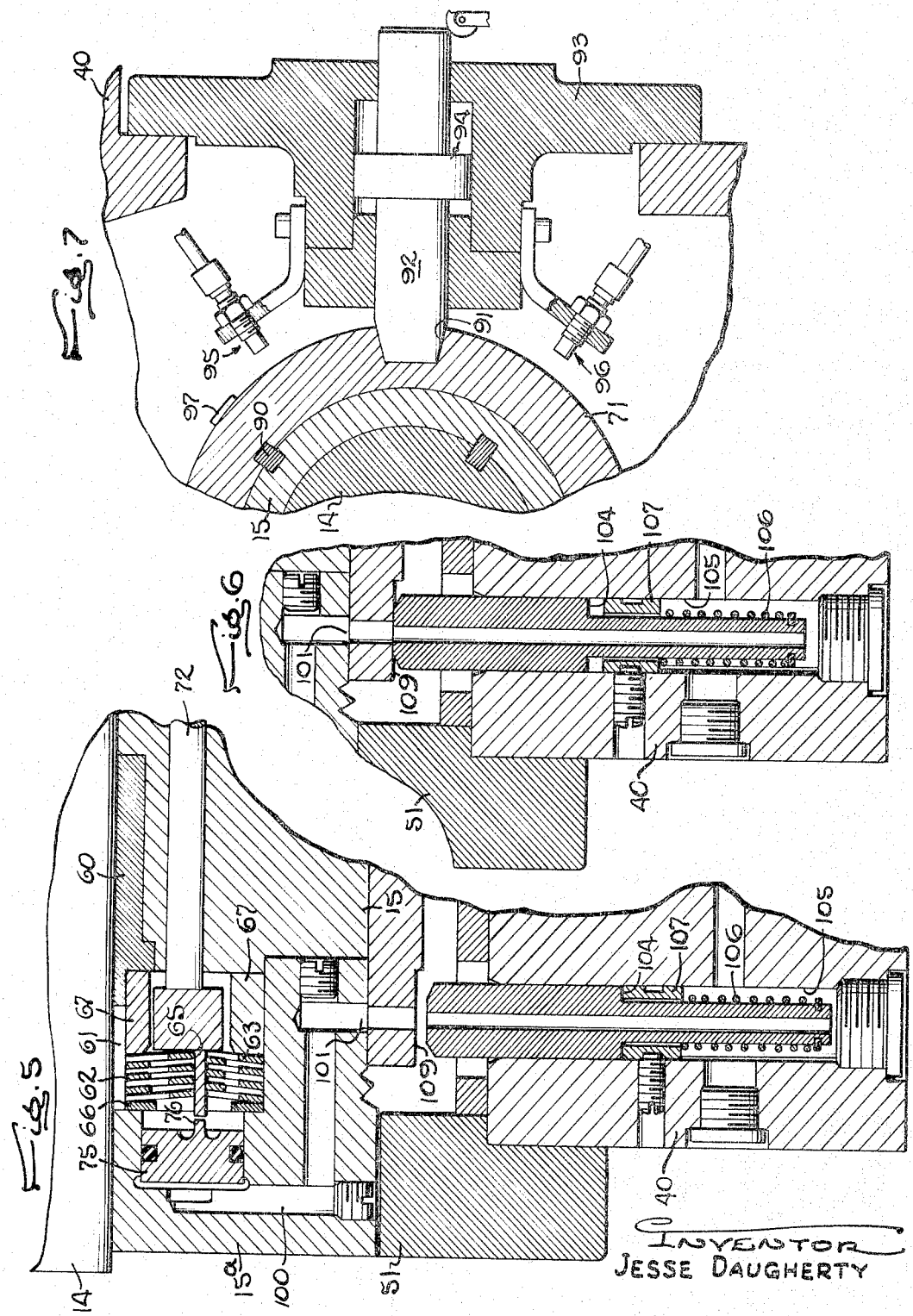

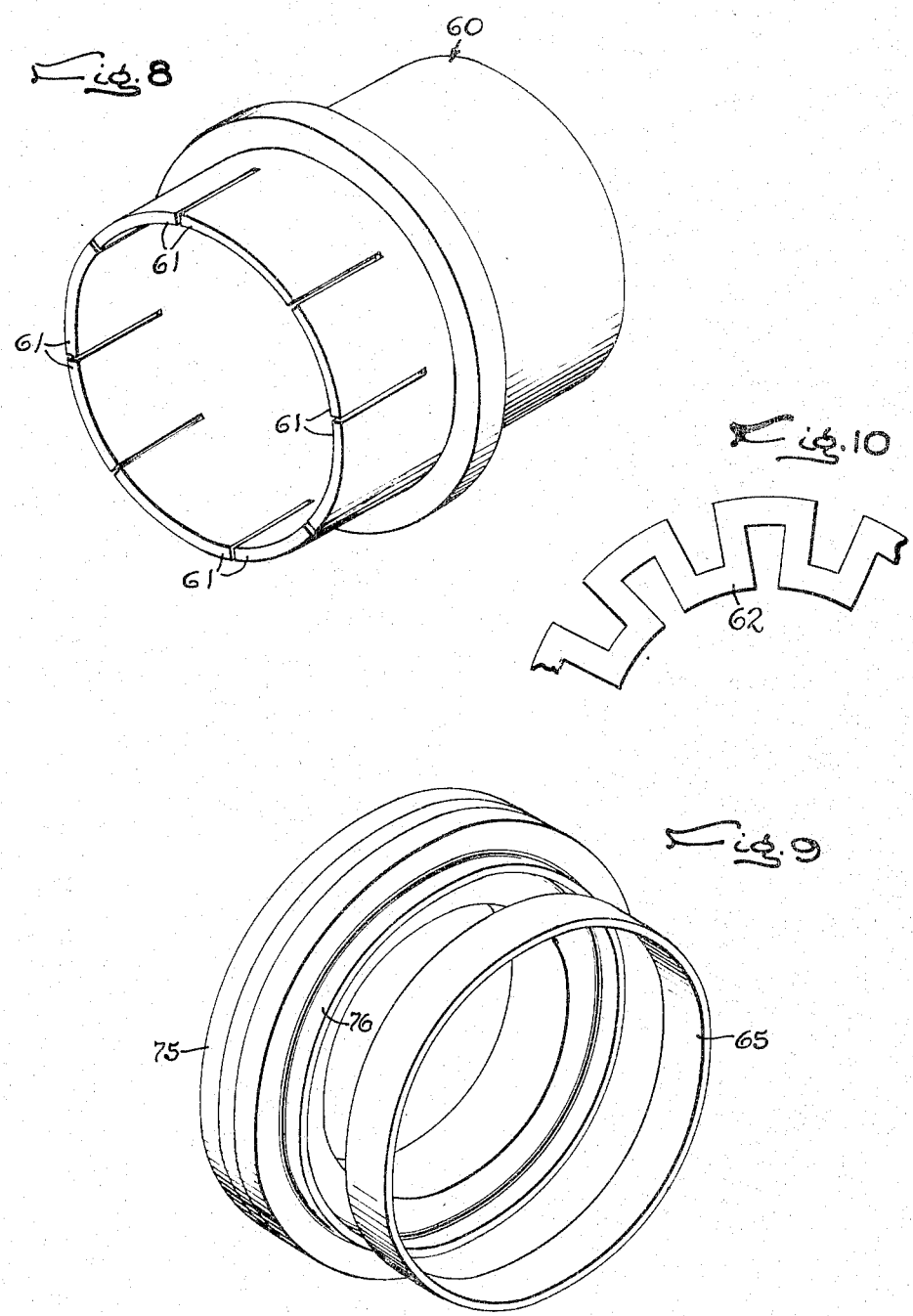

United States Patent Office 3,355,800
Patented Dec. 5, 1967

3,355,800
MACHINE TOOL HEADSTOCK
Jesse Daugherty, Fond du Lac, Wis., assignor to Giddings
  & Lewis Machine Tool Company, Fond du Lac, Wis.,
  a corporation of Wisconsin
Continuation of application Ser. No. 386,272, July 30,
  1964. This application Dec. 21, 1966, Ser. No. 603,685
          13 Claims. (Cl. 29—568)

ABSTRACT OF THE DISCLOSURE

An apparatus for axially positioning a machine tool spindle and clamping the spindle in a fixed number of axially spaced, work starting positions and a tool changing position, together with a tool changing mechanism which presents a tool to the spindle while in its tool changing position and a work support for moving the work along two axes relative to a tool located in and held by the spindle in one of the work starting positions. The clamp embodies slotted conical washers which are axially flexed to solidly lock the spindle in the sleeve.

This is a continuation of my application Ser No. 386,-272, filed July 30, 1964, now abandoned.

Description of the invention

This invention relates generally to machine tools and more particularly concerns a headstock for such tools.

The principal aim of the invention is to provide a novel machine tool headstock permitting rapid and accurate axial translation of the cutting bar or spindle for automatic tool changing or tool location purposes while also achieving solid accurate support of the spindle when the latter is driven during the cutting operation so as to maintain extreme machining accuracy.

A collateral object is to provide a headstock of the above character which facilitates table and saddle feed cutting wherein spindle sag and deflection variations affecting accuracy are avoided or minimized. When employed in a horizontal boring, milling and drilling machine, three axes machining is possible with saddle movement of the workpiece providing workpiece motion along one of the orthogonal axes.

It is also an object of the invention to provide a headstock for a machine tool that is designed specifically for numerical control and which achieves rapid, efficient operation with an economical headstock construction.

An important object of this invention is to provide a headstock of the above character having incremental spindle positioning to allow the spindle to be axially extended very accurately to different predetermined positions and having a clamp to secure the spindle in its sleeve at each of these positions so as to permit minimum extension of the tool, as determined by the workpiece, with maximum rigidity of the tool during machining.

In more detail, it is an object to provide a novel spindle clamping arrangement that is effective to establish a unitary relationship between the sleeve and the spindle and thereby hold the spindle so rigidly as to eliminate radial looseness and prevent axial movement.

Another detailed object is to provide a low friction, low "runout," rotatable mounting for a headstock spindle which contributes significantly to machining accuracy.

A further object is to provide a spindle assembly for a machine tool headstock which may be preassembled and then inserted in the form of a cartridge into the headstock and locked in place.

Other objects and advantages of the invention will become apparent upon reading the following detailed description and upon reference to the drawings, in which:

FIG. 2 is an enlarged fragmentary section taken longitudinally through the headstock of the machine shown in FIG. 1;

FIG. 3 is an enlarged fragmentary section similar to FIG. 2 showing another portion of the headstock;

FIG. 4 is a further enlarged fragmentary section of the left hand portion of the structure shown in FIG. 2;

FIG. 5 is a still further enlarged fragmentary section taken approximately along the line 5—5 shown in FIG. 4;

FIG. 6 is a fragmentary section showing parts found in FIG. 5 in an alternate operating position;

FIG. 7 is an enlarged fragmentary section taken approximately along the line 7—7 in FIG. 2;

FIGS. 8 and 9 are enlarged perspectives of elements otherwise shown in FIG. 4; and FIG. 10 is an enlarged fragmentary plan of one slotted conical washer of the group cooperating with the structure of FIGS. 8 and 9.

Figures 1, 1A:
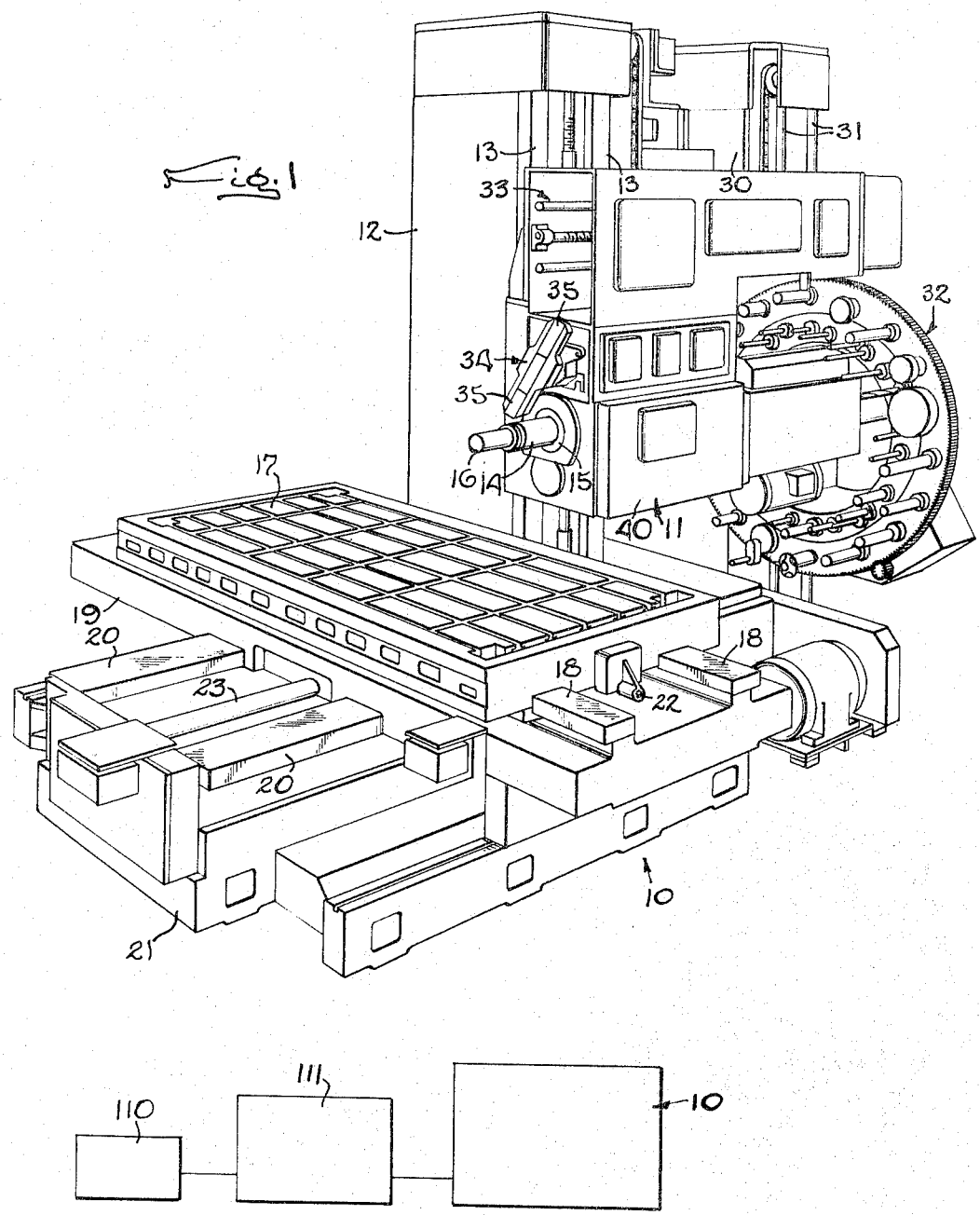
FIGURE 1 is a perspective of a horizontal boring, milling and drilling machine embodying the invention.
FIG. 1a is a schematic representation of the control system for the machine shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown a horizontal boring, milling and drilling machine 10 embodying the invention and including a headstock 11 carried by an upright column 12 for vertical movement on vertical ways 13 positioned at the side of the column 12. The headstock 11 supports a horizontal spindle bar 14 keyed within (see FIG. 7) a power driven spindle sleeve 15, the spindle bar being adapted to support and rotatably drive a cutting tool 16 for machining a workpiece. The workpiece is supported on a table 17 mounted for movement transversely of the spindle axis along ways 18 carried on a saddle 19. The saddle is in turn supported by ways 20 formed on a base frame or bed 21 so that the saddle is movable axially of the spindle. Feed screws 22 and 23 drive the table 17 and the saddle 19, respectively, relative to the cutting tool 16 rotated on the spindle bar 14 along the two axes defined by the ways 18, 20. In addition, vertical movement of the headstock 11 along the ways 13 provides a third possible axis of cutting movement.

The exemplary horizontal boring, drilling and milling machine 10 also embodies apparatus for changing tools in the spindle automatically. For this purpose, a separate upright column 30 is fixed adjacent the machine column 12 to support, by means of vertical guideways 31 on the side face of the column 30, a tool storage matrix 32. A set of tools adapted to be received in the machine tool spindle is stored in the matrix 32 and the machine incorporates apparatus mounted on the headstock 11 for automatically transferring tools between the tool storage matrix and the spindle. In general, the tool changing apparatus comprises a horizontally movable shuttle (not shown) which oscillates along a shuttle trackway 33 and includes tool gripping jaws for grasping the tool in the matrix 32 which has been positioned by the matrix at a shuttle station adjacent the rearward end of the trackway 33. The shuttle is effective to remove the tool from the matrix and transfer it along a horizontal path defined by the trackway 33 to a tool exchange position laterally adjacent the front end of the spindle.

A rotatable transfer arm 34 is mounted on the headstock 11 between the spindle and the shuttle trackway 33. The transfer arm 34 is provided with radially extending tool gripping elements 35 so that, in operation, one of the elements 35 grasps the tool mounted in the spindle bar 14 and the other element grasps the tool carried forwardly by the shuttle. A half turn of the transfer arm 34 is thus effective to position the newly selected tool in the spindle bar and to return the previously used tool to the shuttle which subsequently returns the tool to the matrix 32.

The tool storage matrix 32, although supported on a separate column 30, is movable vertically in synchronism with vertical movement of the machine tool headstock 11, and the tool changing apparatus mounted on the headstock, so that the position of the storage matrix remains substantially the same relative to the headstock. Further details concerning the construction and operation of the machine 10 can be had by reference to copending application Ser. No. 344,931, filed February 14, 1964.

A feature of the present invention is the minimizing of spindle bar deflection and "runout" inaccuracies by employing an effective bearing arrangement for the spindle sleeve 15. To this end, the headstock 11 includes a housing 40 within which is fitted a cylindrical bearing cartridge 41 that supports the outer races of a pair of opposed, tapered, roller bearings 42 and 43. The inner races of the bearings are preloaded between a shoulder 44 formed on the spindle sleeve and a nut 45 threaded on the sleeve periphery. The rear or inner end of the sleeve 15 is guided in a set of alining bearings 52.

The front or outer end of the spindle sleeve 15 is defined by a removable collar 15a bolted to the sleeve. The collar 15a fits freely within a plate 51 forming the front end of the housing 40. The outer surface of the collar 15a is grooved at 53 to form oil slinger structure in order to avoid oil leakage along the collar through the plate 51. Oil is drained from the spindle assembly through a passage 54.

To drive the spindle sleeve 15, a gear 47 is locked on the sleeve between the bearings 42, 43. The gear 47 is engaged by a pinion 48 journaled in the housing 40 and powered by a headstock motor and transmission assembly 49.

The relatively short-length roller bearings 42, 43 can be firmly preloaded without developing excessive friction and resulting heat so that the sleeve 15 is solidly held in fixed relation to the headstock housing 40. The alining bearings 52 insure that the sleeve 15 remains properly axially oriented. Moreover, the bearings 42, 43 are positioned close to the tool holding and cutting end of the spindle so as to be better able to support cutting loads without deflection. Still further, disposition of the spindle drive gear 47 between the preloaded bearings 42, 43 minimizes the likelihood of the spindle driving torque distorting spindle positioning.

It is also important to note that the spindle assembly, that is, the sleeve 15 and the parts which it contains and carries including the bearing cartridge 41 and the bearing 52, constitutes a unitary bench assembly that avoids the difficult and tedious task of assembly in place. In carrying out this aspect of the invention, the bearing cartridge 41 is formed to fit very closely into its angular recess in the housing 40, and the spindle assembly is slid into place before tightening the nut 45 to preload the bearings 42, 43. When the completely preassembled spindle assembly is in proper place, the nut 45 is turned to preload the bearings 42, 43 and this also causes sufficient expansion of the cartridge 41 to tightly lock the cartridge in the housing 40, and thus lock the spindle in the headstock. The expanded cartridge 41 also rigidly seats the outer races of the spindle load carrying bearings 42, 43.

In accordance with one of the aspects of the invention, the spindle bar 14 is solidly clamped within the power driven spindle sleeve 15 while cutting, the clamp being releasable by a hydraulic actuator in the sleeve, and a hydraulic mechanism is provided for axially positioning the unclamped spindle bar relative to the headstock housing 40 so as to facilitate the automatic tool changing operation and to position the tool for a machining operation. Heretofore, the practice with horizontal boring, drilling and milling machines has been to feed the spindle bar axially in order to perform boring operations on a workpiece carried by the machine tool table. It has been known that boring by feeding the saddle with the rotatable spindle fixed against axial movement produces a straighter hole and one with less taper than that obtained by the conventional practice. With spindle feed, the looseness of the bar in the spindle sleeve required for axial movement of the spindle, and the deflection of the bar due to tool cutting force and gravity sag, changes the circle of rotation as the spindle bar feeds out, thus making the generation of a straight hole virtually impossible to achieve in practice. The bore also becomes tapered as the spindle bar feeds out unless a double cutting tool is used.

Through the practice of the invention, saddle feed can be used for boring to produce a straighter hole unaffected by sag and spindle bar deflection. Moreover, by clamping the bar within the spindle sleeve, deflection of the bar is lessened and the resulting rigidity increases machining accuracy. However, since the spindle bar is releasably clamped against axial movement, the machine of the invention does contemplate axial movement of the spindle bar to facilitate positioning the tool for a machining operation and to enable the spindle bar to cooperate effectively with the tool transfer arm 34 and the related portions of the automatic tool changing mechanism.

The preferred clamp of the invention includes a collar 60 anchored in the sleeve 15 and formed with one slotted end so that the slots define yieldable fingers 61 that closely surround the spindle bar 14 (see FIGS. 4 and 8). Concentric groups of slotted conical washers 62 and 63 fit within a cavity 64 formed in the sleeve collar 15a about the fingers 61. Each washer of the group 62, 63 is slightly dished, or conical, as is a Belleville spring, and is radially slotted from its inner and outer peripheries so that the washer defines a modified Greek key pattern (see FIG. 10). The lesser diameter washers 62 closely surround the fingers 61, and a cylindrical ring 65 (see also FIG. 9) is disposed between the groups of washers 62, 63. The conical washers 62, 63 slope oppositely from the intermediate ring 65 so that the assembly defines an annular toggle mechanism. That is, an axial force exerted on the ring 65 and the adjacent edges of the washers 62, 63 tends to flatten the washers and thus develop radial forces which, in this case, react against the outer surface of the cavity 64 and deflect the fingers 61 inwardly so that the fingers solidly grip the periphery of the spindle bar 14.

To hold the washers 62, 63 in proper axial position, the inner edges of the washers 62 and the outer edges of the washers 63 are sandwiched closely between rings 66 and spacers 67. Movement of the washers is thus confined to the desired toggle action.

The substantial total internal surface of the fingers 61, and the heavy forces capable of being transmitted by the conical washer toggle mechanism combine to produce an exceptionally strong clamping action capable of rigidly locking the spindle bar 14 within the sleeve 15. When the clamp is actuated, there is solid, metal-to-metal, radially loaded support from the headstock housing 40 to the spindle bar 14. Clamp actuation does not disturb the position of the bar 14 since, by utilizing concentric, opposite sloping washer groups 62, 63, axial movement is confined to the intermediate ring 65 and no axial reaction forces are developed between the annular surfaces containing the clamping toggle mechanism. Furthermore, the elements making up the clamp mechanism are disposed in a protected position within the spindle sleeve.

To hold the clamp mechanism in normally operated condition, an annular abutment member 68 surrounding the collar 60 is urged against the conical washer toggle mechanism, i.e., to the left in FIGS. 4 and 5, by a plurality of strong Belleville springs 69 stacked about the rear portion of the spindle sleeve 15. The springs 69 are seated against a ring 70 abutting the bearing 52, and they act on the abutment member 68 through an axially slidable stop ring 71 and a plurality of axially extending rods 72 slidably mounted in the sleeve 15. Preferably, the rods 72 are evenly peripherally spaced about the sleeve 15 (see FIG. 2) so that the force transmitted from the springs 69 is exerted substantially uniformly around the annular toggle mechanism defined by the washers 62, 63. The springs 69 are selected to develop a sufficient axial force on the abutment member 68 to overcome the slight resistance of the slotted washers 62, 63 to being flattened out and to further exert a significant radial force against the resilient fingers 61 to solidly clamp the spindle bar within the sleeve. The effectiveness of the clamping mechanism can be appreciated by considering a practical embodiment in which a 4½ inch diameter spindle was firmly held against an axial force of 10,000 pounds. The washers 69 in the embodiment tested exerted about a 14,000 pound force and, assuming a coefficient of friction of 0.1, this would indicate a clamping force of over 100,000 pounds.

The hydraulic actuator for releasing the spindle bar clamp includes an annular piston sealed, and axially slidable, within an annular cylinder cavity opening into the cavity 64. The piston 75 is formed with a ring-like nose portion 76 (see also FIGS. 5 and 9) adapted to abut the toggle mechanism ring 65. Admission of fluid under pressure behind the piston 75 urges the piston nose 76 against the ring 65 so as to develop an axial force on the abutment member 68 in opposition to the force of the springs 69 effective to shift the abutment member away from the washers 62, 63, allowing them to assume their relaxed, more conical configuration, and thus relieving the radial force on the resilient fingers 61.

It will thus be seen that the clamp operating mechanism is also disposed in a protected position within the sleeve 15 and further that the entire clamping mechanism is particularly compact. It should also be noted that the clamping mechanism parts operate essentially in an axial direction with respect to the spindle bar 14 and, hence, they are virtually unaffected by centrifugal force developed incident to operation of the spindle.

The hydraulic mechanism for axially positioning the spindle bar 14 when the latter is unclamped includes a ram 80 which is mounted in the headstock housing 40 for axial but not rotational movement. The ram 80 is connected at 80a to the spindle bar 14 for axial translation of the spindle bar in either direction while permitting free relative rotation between the bar and the ram. The ram is selectively driven by a differential actuator 81 having multiple, interconnected pistons 82 operated by a plurality of hydraulic valves 83 (see FIG. 3). As will be understood by those familiar with this art, operating appropriate ones of the valves 83 shifts the interconnected pistons 82 to various predetermined positions and permits selective axial positioning of the output element of the differential actuator 81 which, in this case, consists of a fork 84. The actuator bracket 84 is connected to the spindle ram 80 by a linear motion amplifying device taking the form of a double rack and pinion arrangement. The latter includes a pinion 85 journaled on the bracket 84 and meshing both with a rack 86 fixed on the headstock housing 40 and with a second rack 87 mounted on the spindle ram 80. This arrangement provides amplification of the linear movement of the actuator bracket 84 as translated to the ram 80 and thence to the spindle bar 14.

Primarily for tool changing purposes, provision is made for arresting rotation of the spindle sleeve 15 and, hence, the spindle bar 14 and the tool carried by the bar, in the same predetermined angular position each time the drive to the spindle is halted. For this purpose, the stop ring 71, while being axially slidable on the sleeve 15, is rotatably anchored to the sleeve by a key 90 (see FIG. 7) and is formed with a peripheral slot 91 (see also FIG. 2) that cooperates with a hydraulically actuated stop pin 92. The pin 92 slides in a bracket 93, mounted solidly on the headstock housing 40, and is shifted radially with respect to the stop ring 71 by a hydraulic actuator 94. The actuator 94, and hence the stop pin 92, is controlled by a pair of proximity switches 95 and 96 which are tripped by lugs 97 adjustably positioned in dovetailed annular grooves 98 formed in the ring 71 (see also FIG. 4). The operation of the stop mechanism is more completely described in application Ser. No. 338,108, filed Jan. 16, 1964, but it is sufficient for present purposes to observe that the switches 95, 96 are coupled to the control circuit of the machine tool so that the adjustable lugs 97 trip one switch that is effective to decelerate the spindle drive and subsequently trip the other switch to halt the spindle drive and energize the actuator 94 that drops the stop pin 92 in the slot 91. The stop pin provides a positive locking engagement between the headstock housing 40 and the spindle sleeve 15 which holds the latter in a predetermined, fixed angular position within the headstock. The spindle bar 14 is slidably keyed within the spindle sleeve and, hence, the stop pin 92 is effective to position the tool carrying spindle bar 14 at a predetermined angular relationship with respect to the tool changing transfer arm 34. For further details of this mechanism, reference can be had to the aforementioned application.

As a further feature of the invention, advantage is taken of the predetermined stopping position of the spindle sleeve 15 to energize the clamp releasing actuator without maintaining a constant fluid coupling between the rotatably driven sleeve and the headstock housing. For this purpose, a passage 100 is formed in the sleeve 15 (see FIG. 5) from the chamber receiving the piston 75 to a peripheral opening 101. An apertured plunger 102 is slidably mounted in the headstock housing 40 for movement radially of the spindle axis into and out of engagement with the periphery of the sleeve 15. The plunger 102 is positioned so that its central aperture 103 is in alinement with the opening 101 in the passage 100 when the sleeve 15 is stopped, and the plunger is further formed with a piston portion 104 which is responsive to the pressure of fluid in a bore 105 within which the plunger slides. A return spring 106 surrounds the plunger 102 and is compressed between a collar 107 anchored in the bore 105 and a snap ring 108 on the plunger. The end of the plunger is adapted to abut a flatted area 109 formed in the peripheral surface of the sleeve 15 about the passage opening 101.

In operation, fluid under pressure introduced into the bore 105 both enters the aperture 103 in the plunger 102 and also acts against the aperture piston portion 104 to shift the plunger against the periphery of the sleeve 15. Since the stop pin 92 insures a fixed predetermined stopping position for the sleeve 15, alinement between the aperture 103 and the passage opening 101 is maintained and shifting movement of the plunger 102 brings the plunger sealing ring 107 into sealing engagement with the flatted portion 108 formed on the sleeve 15, as shown in FIG. 6. Fluid discharged through the aperture 103 is thus transmitted through the passage 100 to the actuator piston 75 and is effective to release the clamp securing the spindle bar 14 to the sleeve 15.

Fluid is, of course, vented from the bore 105 so as to reactuate the spindle bar clamping mechanism prior to resuming rotatable drive of the spindle sleeve 15. This removes the force urging the plunger 102 against the sleeve 15 and the spring 106 returns the plunger to its FIG. 5, rest position. Because of this arrangement, there is no constant rubbing contact between parts of a fluid delivering system extending between the headstock housing and the clamp releasing actuator in the power driven spindle sleeve 15.

The machine 10 is intended for operation under a numerically controlled positioning system of the kind, for example, shown in U.S. Patent No. 3,101,436, issued Aug. 20, 1963. As schematically indicated in FIG. 1a, the system includes a tape reader 110, capable of generating signals corresponding to a prerecorded program, and a control system 111 embodying the computor, memory and converter elements required to translate the program signals into the proper operating impulses for the actuating devices of the machine 10; including the motor and transmission assembly 49, the table feed screw 23 and the spindle ram actuator 81.

Since the spindle is, in effect, tape controlled rather than manually operated, there is no need to include in the headstock 11 the conventional manual feed wheel and traversing turnstile together with the associated infinitely variable axial drive for the spindle bar 14. This substantially reduces the complexity and cost of the headstock, but the advantage of spindle extendibility is retained through the ability of the actuator 81 to positively position the spindle bar to any one of a plurality of predetermined positions. Infinitely variable positioning of the spindle is not required in the machine of the invention since saddle feed is utilized for cutting, and preset tooling in the matrix 32 insures that the control system 111 knows where the cutting elements are in each axial position of the spindle bar 14. Moreover, the actuator 81 moves the spindle bar 14 quickly and directly to a selected axial position.

I claim as my invention:

1. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positioning said spindle bar, means including a resilient device mounted in said sleeve for mechanically clamping said spindle bar to said sleeve so as to lock the spindle bar in axial position for rotation with said sleeve, an actuator formed in said sleeve to exert a force in opposition to said resilient device, and means to energize said actuator so as to unlock said spindle bar for axial movement within said sleeve.

2. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positionng said spindle bar, a pluralty of yieldable fingers fixed in said sleeve and closely surrounding said spindle bar, means including a resilient device mounted in said sleeve for mechanically clamping said fingers against said spindle bar so as to lock the spindle bar in axial position for rotation with said sleeve, an actuator formed in said sleeve to exert a force in opposition to said resilient device, and means to energize said actuator so as to unlock said spindle bar for axial movement within said sleeve.

3. A machine tool headstock comprising, in combination, a housing, a spindle sleeve rotatably mounted in a pair of spaced, tapered preloaded bearings seated in said housing, means in said housing including a gear fixed to said sleeve adjacent said bearings for rotatably driving said spindle sleeve, a spindle bar fitted within said sleeve for axial sliding movement, means in said housing for axially positioning said spindle bar, a yieldable member fixed in said sleeve and closely surrounding said spindle bar, means including a resilient device mounted on said sleeve for mechanically clamping said member against said spindle bar so as to lock the spindle bar in axial position for rotation with said sleeve, an actuator formed in said sleeve to exert a force in opposition to said resilient devce, and means to energize said actuator so as to unlock said spindle for axial movement within said sleeve.

4. A machine tool headstock comprising, in combination, a housing, a spindle sleeve rotatably mounted in a pair of spaced, tapered preloaded bearings seated in said housing adjacent the cutting end of the headstock, means in said housing including a gear fixed to said sleeve between said bearings for rotatably driving said spindle sleeve, an alining bearing mounted in said housing and supporting the inner end of said sleeve, a spindle bar fitted within said sleeve for axial sliding movement, means in said housing for axially positioning said spindle bar, means including a resilient device mounted on said sleeve for mechanically clamping said spindle bar to said sleeve so as to lock the spindle bar in axial position for rotation with said sleeve, an actuator formed in said sleeve to exert a force in opposition to said resilient device, and means to energize said actuator so as to unlock said spindle for axial movement within said sleeve.

5. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positioning said spindle bar, a yieldable member fixed in said sleeve and closely surrounding said spindle bar, slotted conical washers fitted in said sleeve and closely surrounding said member so as to define an annular toggle mechanism, means including springs carried on said spindle sleeve for exerting an axial force on said toggle mechanism mechanically clamping said member against said spindle bar so as to lock the spindle bar in axial position for rotation with said sleeve, an actuator formed in said sleeve to exert a force in opposition to said resilient device, and means to energize said actuator so as to unlock said spindle bar for axial movement within said sleeve.

6. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positioning said spindle bar, a collar fixed in said sleeve and having a slotted end defining a plurality of yieldable fingers closely surrounding said spindle bar, concentric slotted conical washers fitted in said sleeve and closely surrounding said fingers so as to define an annular toggle mechanism, means for exerting an axial force on said toggle mechanism mechanically clamping said fingers against said spindle bar so as to lock the spindle bar in axial position for rotation with said sleeve, and means to unlock said spindle bar for axial movement within said sleeve.

7. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positioning said spindle bar, means for clamping said sleeve and bar together, an annular hydraulic actuator formed in said sleeve for operating said clamping means, said sleeve being formed with a peripherally opening passage leading to said actuator, an apertured plunger slidably mounted in said housing in position to seal against said spindle with the aperture in alinement with said passage, said plunger being formed with a piston portion, and means for supplying fluid under pressure to said piston so as to hydraulically urge the piston against said sleeve and deliver pressurized fluid to said actuator.

8. A machine tool headstock comprising, in combination, a housing, a spindle sleeve rotatably mounted in said housing, means in said housing for rotatably driving said spindle sleeve, a spindle bar fitted within said sleeve for axial sliding movement, means in said housing for axially positioning said spindle bar, a yieldable member fixed in said sleeve and closely surrounding said spindle bar, means including a resilient device mounted on said sleeve for mechanically clamping said member against said spindle bar so as to lock the spindle bar in axial position for rotation with said sleeve, an annular hydraulic actuator formed in said sleeve to exert a force, when pressurized, in opposition to said resilient device so as to unlock said spindle for axial movement within said sleeve, said sleeve being formed with a peripherally opening passage leading to said actuator, an apertured plunger slidably mounted in said housing in position to seal against said spindle with the aperture in alinement with said passage, said plunger being formed with a piston portion, and means for supplying fluid under pressure to said piston so as to hydraulically urge the piston against said sleeve and deliver pressurized fluid to said actuator.

9. A machine tool comprising, in combination, a base frame having a column, a saddle translatable along one axis on said base frame, a table movable along a second axis on said saddle and being adapted to support a workpiece, a headstock positionable along a third axis on said column, a horizontal power driven spindle sleeve rotatably mounted in said headstock, an axially slidable spindle bar fitted in said sleeve and having a tool mounting end overlying said table, a plurality of yieldable fingers fixed in said sleeve and closely surrounding said spindle bar, means including a resilient device mounted in said sleeve for mechanically clamping said fingers against said spindle bar so as to lock the spindle bar in axial position for rotation with said sleeve, an actuator formed in said sleeve to exert a force in opposition to said resilient device, means to energize said actuator so as to unlock said spindle for axial movement within said sleeve, and a hydraulic mechanism for axially positioning said spindle bar when unclamped.

10. For use in a machine tool, an annular radially acting clamp comprising, in combination, means defining an annular chamber, a first set of stacked slotted conical washers fitted in said chamber, a cylindrical ring fitted within said set of washers, a second set of stacked slotted conical washers fitted in said ring, said sets of washers being sloped in opposite directions, and means for transferring an axial force against said ring and the inner edges of said washers so as to tend to flatten the washers and thus create an inwardly acting annular clamping action.

11. A machine tool comprising, in combination, a base frame having a column, a headstock positionable along one axis on said column, a workpiece supporting table positioned adjacent said column, means for moving said column and said table relative to one another in work performing motions along second and third axes located at right angles to one another, a horizontal power driven spindle sleeve rotatably mounted in said headstock, an axially slidable spindle bar fitted in said sleeve and having a tool mounting end above said table, a releasable clamp carried by said sleeve for locking said spindle bar to said sleeve, a tool changing mechanism mounted to present successive tools at a fixed position relative to said tool carrying end, means for axially positioning said spindle bar when unclamped to any one of a fixed number of predetermined, axially spaced, work starting reference positions and a position to receive tools from said tool changing mechanism, and a numerically controlled system for coordinately operating said tool changing mechanism, said spindle bar positioning means, and said clamp for axially positioning said spindle (1) to said tool receiving position to receive a tool from said tool changing mechanism; (2) to locate a tool and clamp said spindle bar at any one of said predetermined work starting reference positions; and (3) to thereafter control the work performing motions along said second and third axes.

12. A machine tool comprising, in combination, a base frame having a column, a saddle translatable along one axis on said base frame, a table movable along a second axis on said saddle and being adapted to support a workpiece; a headstock positionable along a third axis on said column, a horizontal power driven spindle sleeve rotatably mounted in said headstock, an axially slidable spindle bar fitted in said sleeve and having a tool mounting end above said table, a releasable clamp carried by said sleeve for locking said spindle bar to said sleeve, a tool changing mechanism mounted to present successive tools at a fixed position relative to said tool carrying end, means for axially positioning said spindle bar when unclamped to any one of a fixed number of predetermined, axially spaced, work starting reference positions and a position to receive tools from said tool changing mechanism, and a numerically controlled system for coordinately operating said tool changing mechanism, said spindle bar positioning means, and said clamp for axially positioning spindle (1) to said tool receiving position to receive a tool from said tool changing mechanism; (2) to locate a tool and clamp said spindle bar at any one of said predetermined work starting reference positions; and (3) to thereafter drive said saddle and table along said axes in work performing motions.

13. The combination of claim 12 in which said means for axially positioning said spindle bar is a hydraulic differential actuator.

References Cited

UNITED STATES PATENTS

| | | | |
|---|---|---|---|
| 3,052,011 | 9/1962 | Brainard | 29—568 |
| 3,034,408 | 5/1962 | Kampmeier | 90—11.1 |
| 3,073,024 | 1/1963 | Hutchens | 29—568 |
| 2,749,806 | 6/1956 | Stephan | 90—11.1 X |
| 2,615,372 | 10/1952 | Coffin | 90—16 |

RICHARD H. EANES, Jr., *Primary Examiner.*